Nov. 30, 1926. 1,609,198
A. G. J. RAPP
BAR FEEDER FOR SAND HOPPERS
Filed May 26, 1924 4 Sheets-Sheet 1
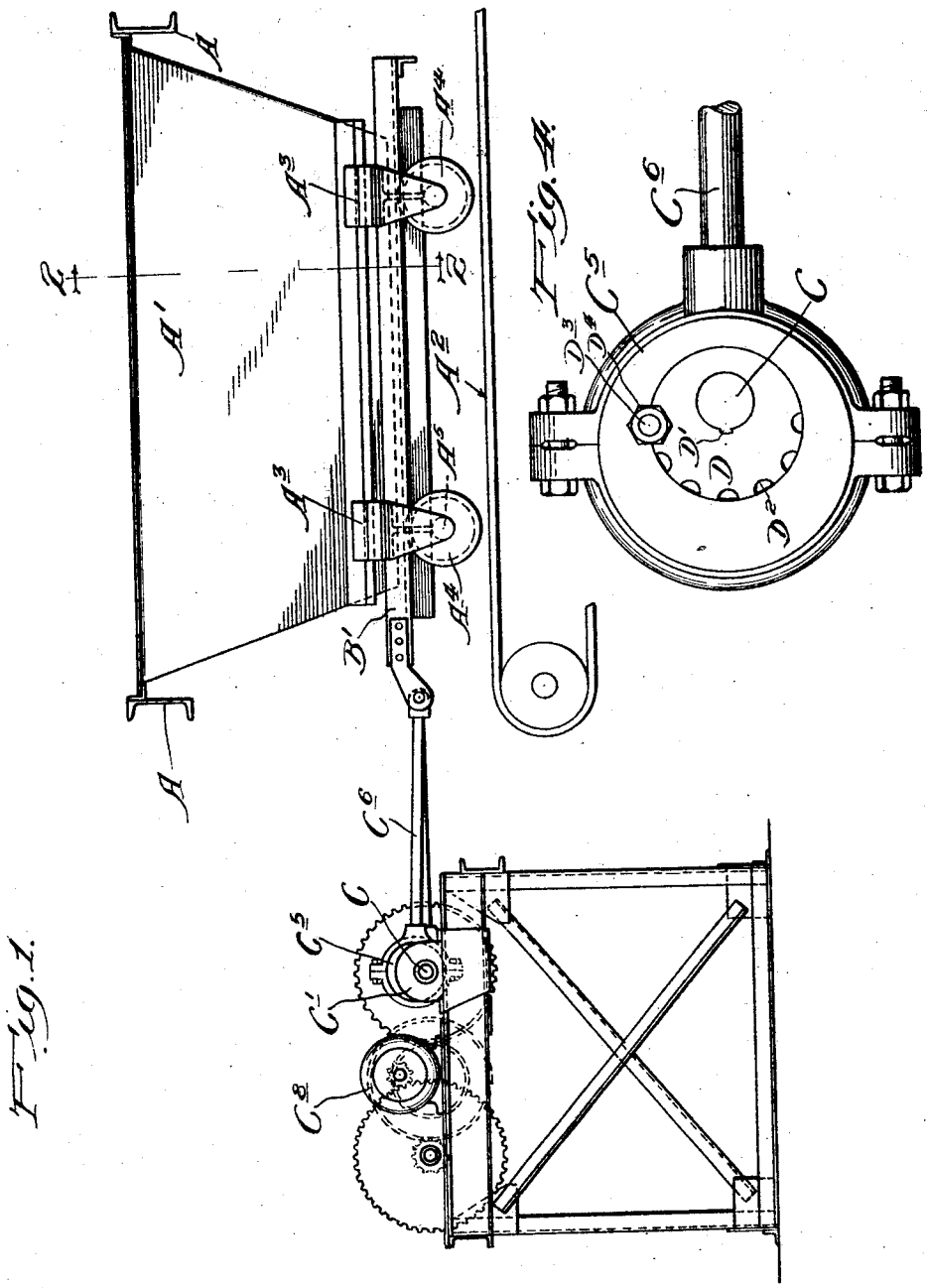
Inventor:
Axel G. J. Rapp,
by Parker & Carter
Attys

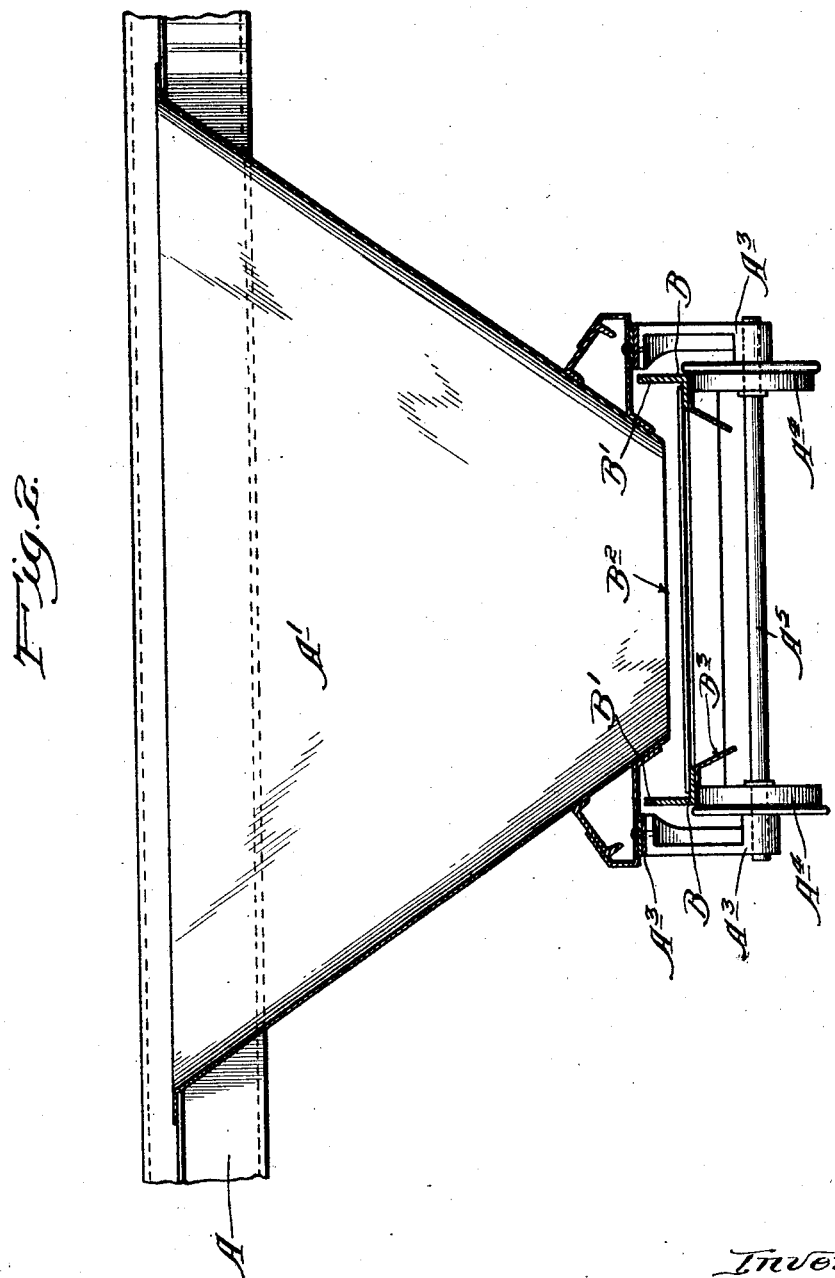

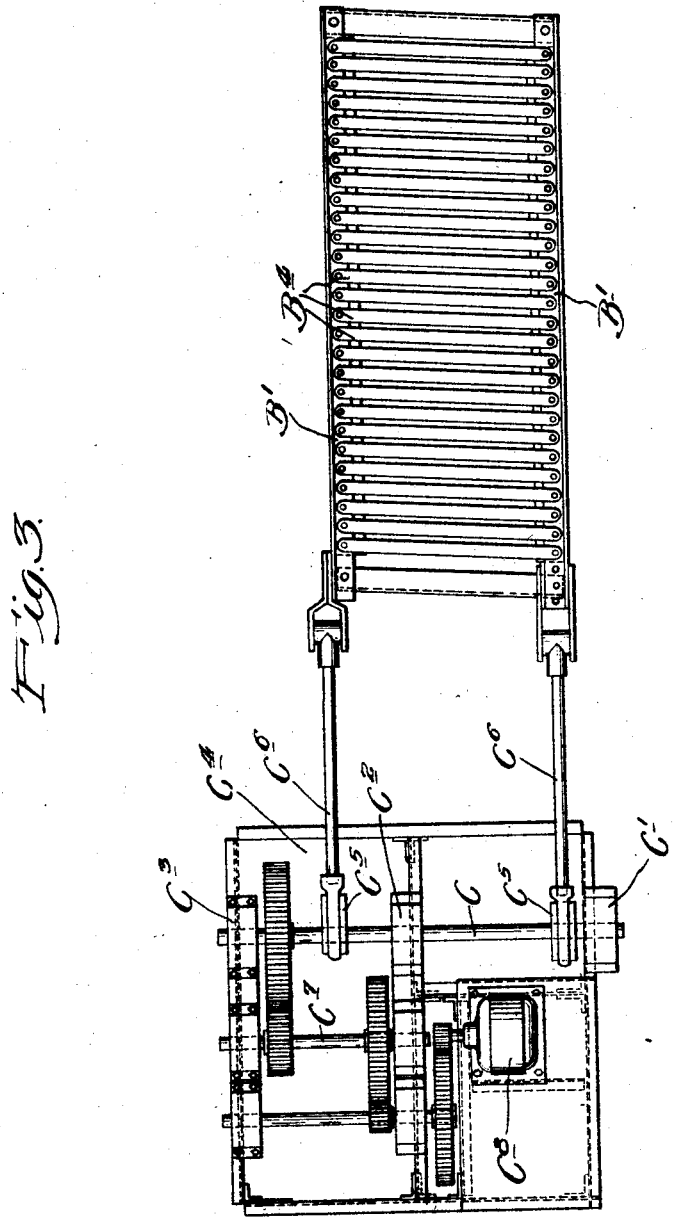

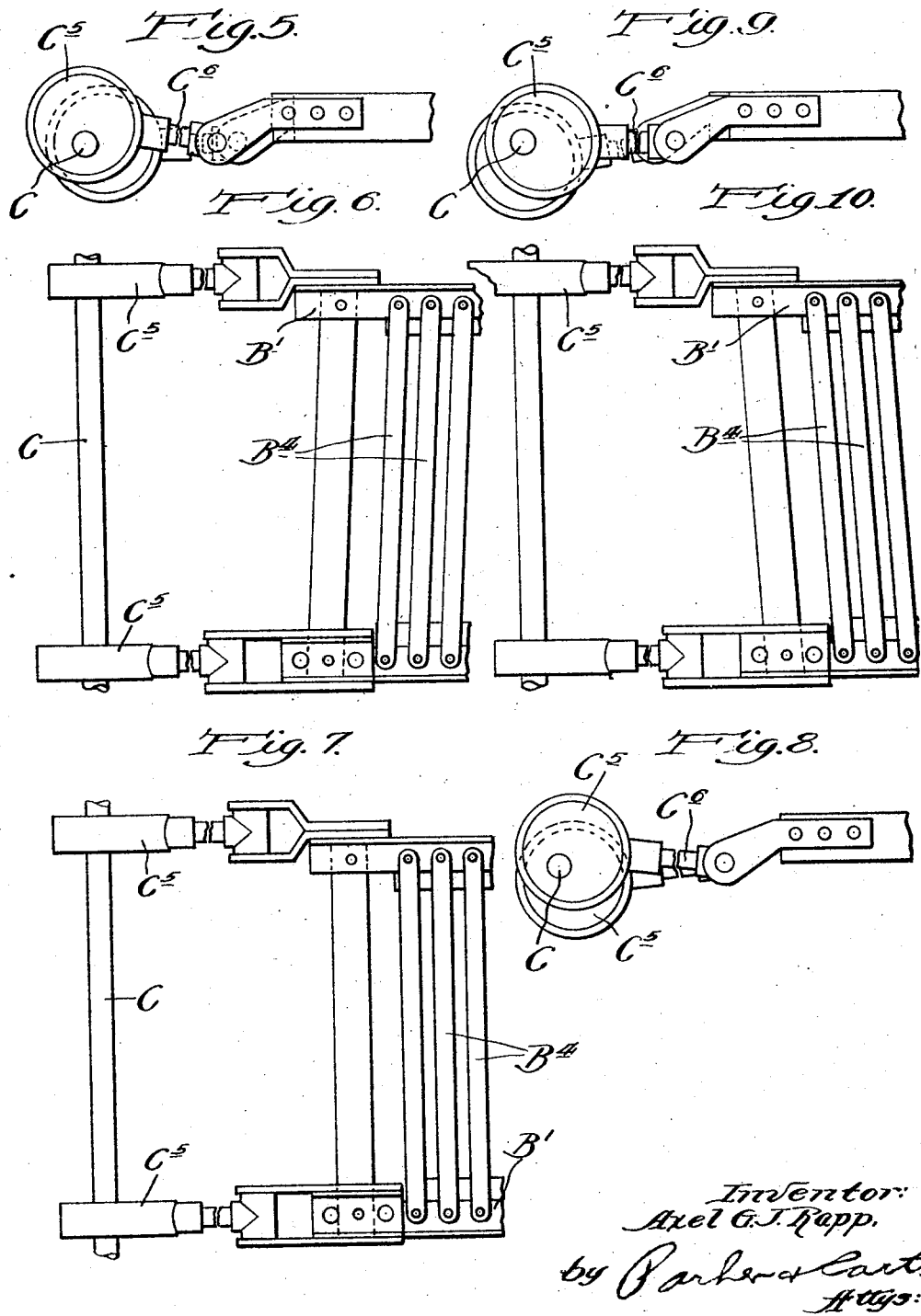

Patented Nov. 30, 1926.

1,609,198

UNITED STATES PATENT OFFICE.

AXEL G. J. RAPP, OF CHICAGO, ILLINOIS, ASSIGNOR TO LINK-BELT COMPANY, OF CHICAGO, ILLINOIS, A CORPORATION OF ILLINOIS.

BAR FEEDER FOR SAND HOPPERS.

Application filed May 26, 1924. Serial No. 716,079.

My invention relates to improvements in bar feeder for sand hoppers and the like and has for one object to provide a new and improved form of feeder whereby wet sand such as is used in a foundry or other similar material may be fed from a hopper to a conveyor or other disposal means.

I propose to provide a bar feeder closing the bottom of the chute or hopper, the bars being so supported and actuated that they will move bodily in a transverse direction and also are given a rocking motion in a horizontal plane, thus insuring smooth and regular feed.

My invention is illustrated more or less diagrammatically in the accompanying drawings, wherein:

Figure 1 is a side elevation of the hopper and feeder;

Figure 2 is a section along the line 2—2 of Figure 1;

Figure 3 is a plan view;

Figure 4 is a detail of the eccentric;

Figure 5 is a fragmentary side elevation of the eccentric connection;

Figure 6 is a fragmentary plan view of the parts in the position shown in Figure 5;

Figure 7 is a fragmentary plan view;

Figure 8 is a side elevation showing the parts in different position;

Figures 9 and 10 are an elevation and plan view showing the parts in still a different position.

Like parts are indicated by like characters throughout the specification and claims.

A is a supporting framework. It carries a hopper $A^1$ having a wide open bottom. This hopper is adapted to contain sand or other similar material and is so disposed that material discharged from it will fall upon a conveyor $A^2$. Depending downwardly from the wall of this hopper are brackets $A^3$, $A^3$ there being two on either side of the hopper. Flanged wheels $A^4$ $A^4$ mounted on axles $A^5$ are supported by opposed pairs of these brackets $A^3$.

Resting on the flanged wheels $A^4$ are two parallel horizontal frame members B, each of them having vertical flanges extending up above the discharge plane of the hopper mouth $B^2$. $B^3$ are aprons inclined downwardly and inwardly from the inner edge of said members B to guide material away from the wheels $A^4$. $B^4$ $B^4$ are flat bars pivoted at either end on one of the members B and supported only at their ends. These bars are in a horizontal plane and close the open mouth of the hopper. The space between these bars is such that when the bars are at rest, there will be little, if any, of the moist sand or similar material between them.

C is an eccentric shaft mounted in bearings $C^1$ $C^2$ $C^3$ on a supporting frame $C^4$. $C^5$ $C^5$ are eccentrics on the shaft C. These eccentrics are angularly staggered ninety degrees. $C^6$ are eccentric rods leading from the eccentric $C^5$ to the members $B^1$. $C^7$ indicates a gear train by means of which the shaft C is rotated by a motor $C^8$.

When this motor operates the eccentric shaft will be rotated and each of the bars $B^4$ will be given a reciprocating motion. Since the eccentrics are spaced ninety degrees apart, the reciprocation of the bars $B^4$ will not be even. At certain times they will be going in one direction. Then one reverses and then another reverses, then they go back together and repeat. The result of this is that the bars $B^4$ are given a transverse movement in the plane of the discharge. They are also given a rotary movement. The result is that there is movement of these bars throughout their entire length going across the bottom of the mass of material and thus material will be fed through spaces between these bars throughout their entire length, thus insuring feeding of the sand from the entire hopper and preventing any concentration of feed at any particular point.

Each eccentric is adjustable on the shaft C, there being interposed between the eccentric $C^5$ and the shaft a secondary eccentric D keyed as at $D^1$ on the shaft C and having a plurality of semi-cylindrical notches $D^2$ on its face. These notches are adapted to be engaged by a holding bolt $D^3$ with a nut $D^4$ to lock the eccentric $C^5$ in adjustable or adjusted position on the eccentric member D, thus making it possible to vary the throw of the eccentric.

It will be evident that while I have shown in my drawings an operative device, still many changes might be made in the size, shape and arrangement of parts without departing materially from the spirit of my invention and I wish, therefore, that my showing be taken in a large sense as diagrammatic.

I claim:

1. A bar feeder comprising a hopper having an open bottom, a plurality of parallel horizontally spaced bars extending clear across one dimension of the hopper and arranged side by side beneath the entire discharge mouth thereof, means for separately reciprocating the opposed ends of said bars to give the bars a lateral movement of translation, the reciprocating means being so timed that during various parts of the complete cycle the opposed ends of the bars move in the same direction and during another part of the cycle move in opposite directions.

2. The combination with a hopper of a plurality of brackets downwardly depending therefrom, outwardly flanged wheels mounted for rotation thereon, parallel supporting bars carried by said wheels, parallel spaced feeder bars pivoted on the supporting bars and extending between them, an eccentric shaft, eccentrics thereon spaced 90°, eccentric rods connecting one of said eccentrics and each of the supporting bars and means for rotating the eccentric shaft.

3. A bar feeder comprising a plurality of supporting flanged wheels mounted for rotation, parallel supporting bars carried on said wheels, their lateral movement being limited by the flanges, parallel spaced feeder bars pivoted on the supporting bars and extending between them, the length of these bars being such that when they are perpendicular to the supporting bars, the supporting bars are positioned by the flanges, an eccentric shaft, eccentrics thereon spaced 90°, eccentric rods connecting one of each of said supporting bars and means for rotating the eccentric shaft.

4. The combination with a hopper of a plurality of brackets downwardly depending therefrom, outwardly flanged wheels mounted for rotation thereon, parallel supporting bars carried by said wheels, parallel spaced feeder bars pivoted on the supporting bars and extending between them, eccentrics spaced 90°, eccentric rods connecting one of the eccentrics and each of the supporting bars and means for rotating the eccentrics.

5. A bar feeder comprising a plurality of supporting flanged wheels mounted for rotation, parallel supporting bars carried on said wheels, their lateral movement being limited by the flanges, parallel spaced feeder bars pivoted on the supporting bars and extending between them, the length of these bars being such that when they are perpendicular to the supporting bars, the supporting bars are positioned by the flanges, eccentrics spaced 90°, eccentric rods connecting one of the eccentrics and each of the supporting bars and means for rotating the eccentrics.

6. The combination with a hopper of a plurality of brackets downwardly depending therefrom, outwardly flanged wheels mounted for rotation thereon, parallel supporting bars carried by said wheels, parallel spaced feeder bars pivoted on the supporting bars and extending between them, and means for reciprocating the supporting bars to cause the bars to move at one time in the same direction and at another time in the opposite direction during the cycle of operation.

7. A bar feeder comprising a plurality of supporting flanged wheels mounted for rotation, parallel supporting bars carried on said wheels, their lateral movement being limited by the flanges, parallel spaced feeder bars pivoted on the supporting bars and extending between them, the length of these bars being such that when they are perpendicular to the supporting bars, the supporting bars are positioned by the flanges, and means for reciprocating the supporting bars to cause the bars to move at one time in the same direction and at another time in the opposite direction during the cycle of operation.

8. The combination with a hopper of a plurality of brackets downwardly depending therefrom, outwardly flanged wheels mounted for rotation thereon, parallel supporting bars carried by said wheels, parallel spaced feeder bars pivoted on the supporting bars and extending between them, means for reciprocating said supporting bars and for reversing the direction of movement of each bar at a different point in the cycle of operation.

9. A bar feeder comprising a plurality of supporting flanged wheels mounted for rotation, parallel supporting bars carried on said wheels, their lateral movement being limited by the flanges, parallel spaced feeder bars pivoted on the supporting bars and extending between them, the length of these bars being such that when they are perpendicular to the supporting bars, the supporting bars are positioned by the flanges, means for reciprocating said supporting bars and for reversing the direction of movement of each bar at a different point in the cycle of operation.

Signed at Chicago, county of Cook and State of Illinois, this 21st day of May, 1924.

AXEL G. J. RAPP.